US 12,265,034 B2

(12) United States Patent
Norichika et al.

(10) Patent No.: US 12,265,034 B2
(45) Date of Patent: Apr. 1, 2025

(54) DETECTION TOOL AND DETECTION METHOD

(71) Applicant: J. MORITA MFG. CORP., Kyoto (JP)

(72) Inventors: Takaaki Norichika, Kyoto (JP); Shinji Mikami, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 891 days.

(21) Appl. No.: 17/319,733

(22) Filed: May 13, 2021

(65) Prior Publication Data

US 2021/0356401 A1    Nov. 18, 2021

(30) Foreign Application Priority Data

May 14, 2020   (JP) ................. 2020-084915

(51) Int. Cl.
*G01N 21/78*   (2006.01)
*A61C 1/00*    (2006.01)
*G01N 31/22*   (2006.01)
*G01N 21/77*   (2006.01)

(52) U.S. Cl.
CPC ......... *G01N 21/783* (2013.01); *A61C 1/0061* (2013.01); *G01N 31/229* (2013.01); *A61C 2201/002* (2013.01); *G01N 2021/7756* (2013.01)

(58) Field of Classification Search
None
See application file for complete search history.

(56) References Cited

U.S. PATENT DOCUMENTS

| 5,649,766 | A | 7/1997 | Blake |
| 6,786,897 | B2 | 9/2004 | John et al. |
| 2002/0152929 | A1 | 10/2002 | Burgath et al. |
| 2003/0036747 | A1 | 2/2003 | Ie et al. |
| 2003/0185706 | A1* | 10/2003 | Ribi ................. G01N 31/229 436/1 |
| 2009/0128330 | A1* | 5/2009 | Monroe .............. G16H 20/17 340/568.1 |
| 2013/0266430 | A1 | 10/2013 | Hasegawa |
| 2017/0323155 | A1* | 11/2017 | Biswas ................ G01S 15/86 |
| 2020/0025207 | A1 | 1/2020 | Mackin et al. |
| 2020/0309607 | A1* | 10/2020 | Small ................ C09B 67/0083 |

FOREIGN PATENT DOCUMENTS

| CN | 110733646 A | 1/2020 |
| DE | 3302584 A1 | 7/1984 |
| DE | 10 2016 202 228 A1 | 8/2017 |

(Continued)

OTHER PUBLICATIONS

Japanese Office Action issued Sep. 27, 2022 in Japanese Patent Application No. 2020-084915 (with unedited computer generated English Translation), 8 pages.

(Continued)

*Primary Examiner* — Erica S Lin
(74) *Attorney, Agent, or Firm* — Oblon, McClelland, Maier & Neustadt, L.L.P.

(57) ABSTRACT

Provided is a detection tool that detects a temperature of air. The detection tool includes a detection section that detects a temperature of air released from an air turbine handpiece, and a main body that includes a surface. The detection section is provided on the surface to allow the air turbine handpiece to be brought close to the detection section.

10 Claims, 9 Drawing Sheets

(56) References Cited

FOREIGN PATENT DOCUMENTS

| | | |
|---|---|---|
| JP | 46-917 B | 1/1971 |
| JP | 58-56936 U | 4/1983 |
| JP | 60-56242 U | 4/1985 |
| JP | 60-188344 U | 12/1985 |
| JP | 1-227031 A | 9/1989 |
| JP | 2002-322014 A | 11/2002 |
| JP | 2005-291825 A | 10/2005 |
| JP | 2019-146814 A | 9/2019 |
| TW | 201219015 A1 | 5/2012 |

OTHER PUBLICATIONS

Japanese Office Action issued on Mar. 14, 2023 in Japanese Patent Application No. 2020-084915 (with unedited computer-generated English translation), 14 pages.
Combined Chinese Office Action and Search Report issued Aug. 5, 2023, in corresponding Chinese Patent Application No. 202110524522.1 (with English Translation), 15 pages.
Extended European Search Report issued Oct. 14, 2021 in European Patent Application No. 21172732.6, 8 pages.

\* cited by examiner

DETECTION TOOL AND DETECTION METHOD

CROSS-REFERENCE TO RELATED APPLICATIONS

This application claims priority under 35 U.S.C. § 119 from Japanese Patent Application No. 2020-084915, filed May 14, 2020. The entire content of the above application is incorporated herein by reference.

BACKGROUND

Field

The present disclosure relates to a detection tool and a detection method.

Description of the Background Art

Conventionally, there is known a technique that detects an abnormality in a handpiece, For example, U.S. Pat. No. 6,786,897 and DE Patent Publication No. 10 2016 202 228 disclose a technique which uses a temperature detecting member attached to a handpiece to determine whether or not a thermal abnormality is present in the handpiece.

SUMMARY

In the technique described in the patent literatures described above, since the temperature detecting member is integrated with the handpiece, the temperature detecting member suffers from fast degradation during the use of the handpiece.

The present disclosure has been accomplished in view of the aforementioned problems, and an object thereof is to provide a detection tool capable of determining whether or not a thermal abnormality is present in handpiece for a long period of time and a detection method using the detection tool.

According to the present disclosure, a detection tool that detects the temperature of air is provided. The detection tool includes a detection section that detects a temperature of air released from the air turbine handpiece, and a main body that includes a surface. The detection section is provided on the surface so as to allow the air turbine handpiece to be brought close to the detection section.

In accordance with the present disclosure, a detection method for detecting a temperature of air is provided. The detection method includes driving the air turbine handpiece to operate for a predetermined time and bringing an air turbine handpiece close to a detection tool that detects the temperature of air within a predetermined distance.

The foregoing and other objects, features, aspects and advantages of the present disclosure will become apparent from the following detailed description of the present disclosure when taken in conjunction with the accompanying drawings.

DETAILED DESCRIPTION OF THE EMBODIMENTS

Embodiments of the present disclosure will be described in detail with reference to the drawings. In the drawings, the same or corresponding portions are denoted by the same reference numerals, and the description thereof will not be repeated.

APPLICATION EXAMPLE

Figure 1:
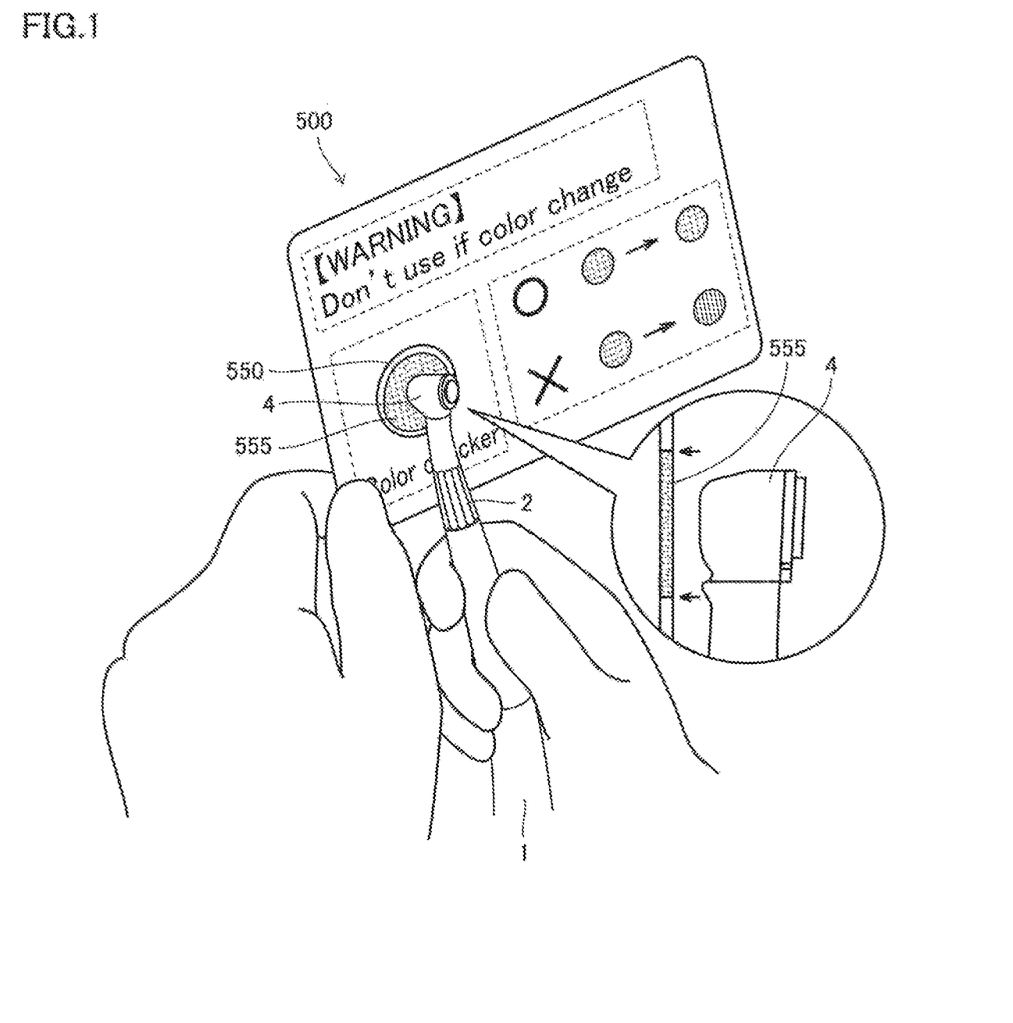
FIG. 1 is a schematic diagram illustrating an application example of a detection tool according to the present embodiment.

An application example of a detection tool (thermal gauge) 500 according to the present embodiment will be described with reference to FIG. 1. FIG. 1 is a schematic diagram illustrating an application example of the detection tool 500 according to the present embodiment.

The detection tool 500 according to the embodiment is a card-type temperature detection tool that detects the temperature of air released from an air turbine handpiece 1. When an operator such as a dentist grasps a grip 2 of the air turbine handpiece 1 and brings a head 4 of the air turbine handpiece 1 close to a detection section 550 of the detection tool 500, a thermo-sensitive material 555 provided in the detection section 550 may change color in response to the temperature of air released from the head 4 of the air turbine handpiece 1.

The thermo-sensitive material 555 provided in the detection section 550 of the detection tool 500 changes color when the temperature of the detected air is equal to or higher than a predetermined temperature. When the temperature of an released from the air turbine handpiece 1 that is brought close to the detection tool 500 by the operator is equal to or higher than the predetermined temperature, the thermo-sensitive material 555 provided in the detection section 550 changes color in response to the temperature of the air.

Thus, the operator may use the detection tool 500 to determine whether or not a thermal abnormality is present in the air turbine handpiece 1. Further, since the detection tool 500 is separated from the air turbine handpiece 1, it is possible to use the detection tool 500 for a long period of time to determine whether or not a thermal abnormality is present in the air turbine handpiece 1 without suffering from degradation during the use of the air turbine handpiece 1.

[Configuration of Air Turbine Handpiece]

The configuration of the air turbine handpiece 1 according to the present embodiment will be described with reference to FIGS. 2 to 5. The air turbine handpiece 1 according to the present embodiment is a handpiece to be used by a dentist and is configured to rotate a cutting tool 5 attached to the head 4 by a driving force generated by air. Hereinafter, the configuration of the air turbine handpiece 1 will be described in detail.

Figure 2:
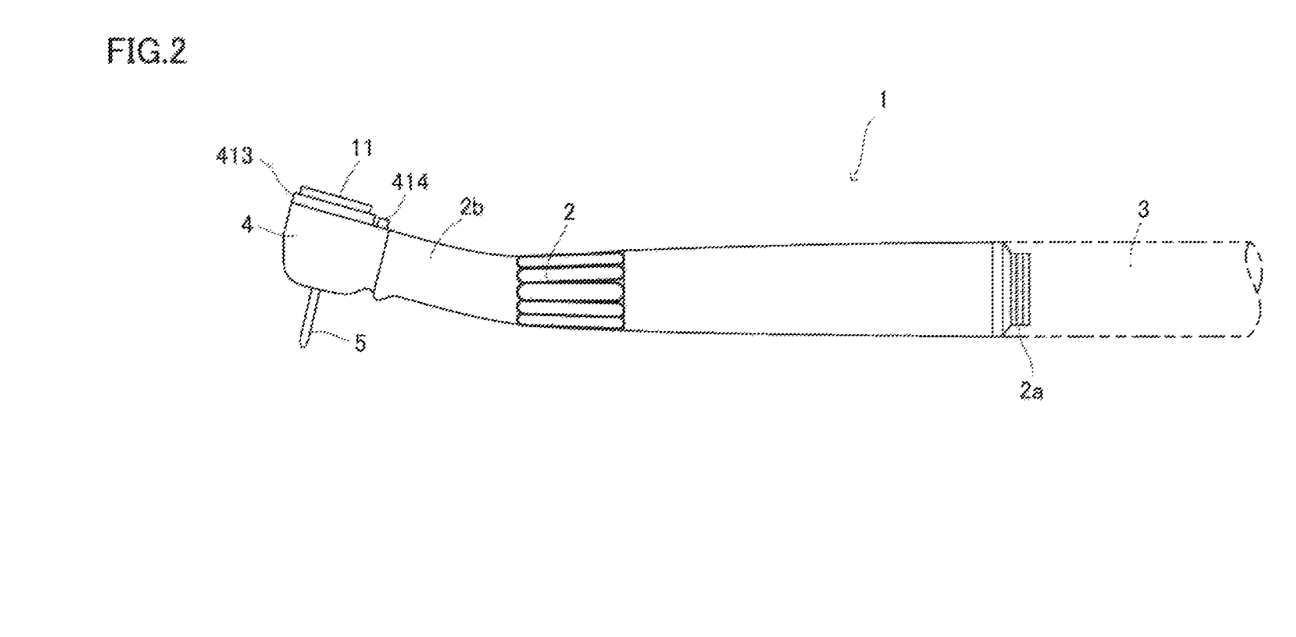
FIG. 2 is a side view illustrating an air turbine handpiece according to the present embodiment.
Figure 3:
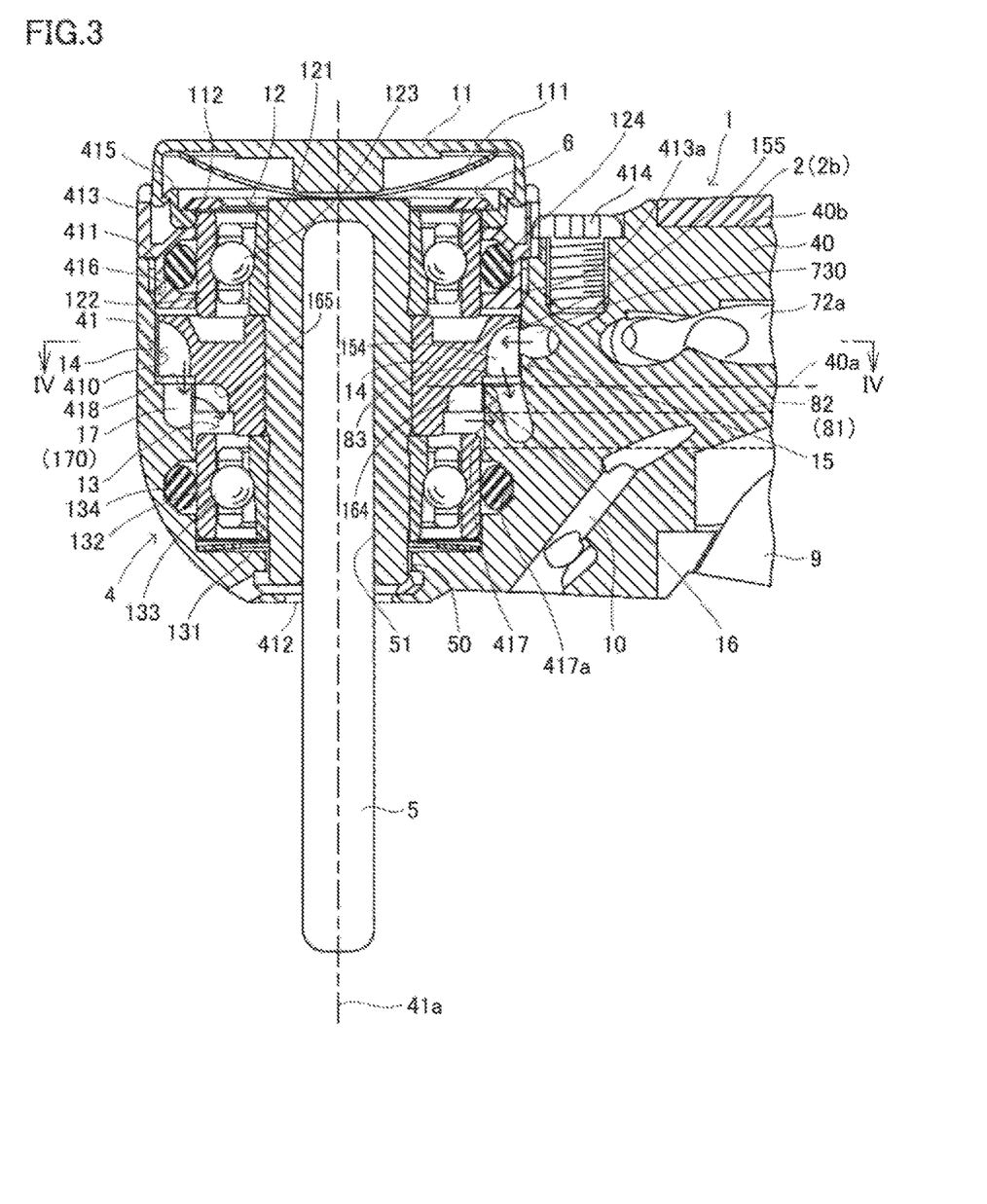
FIG. 3 is a longitudinal sectional view illustrating a main part of the air turbine handpiece according to the present embodiment.
Figure 4:
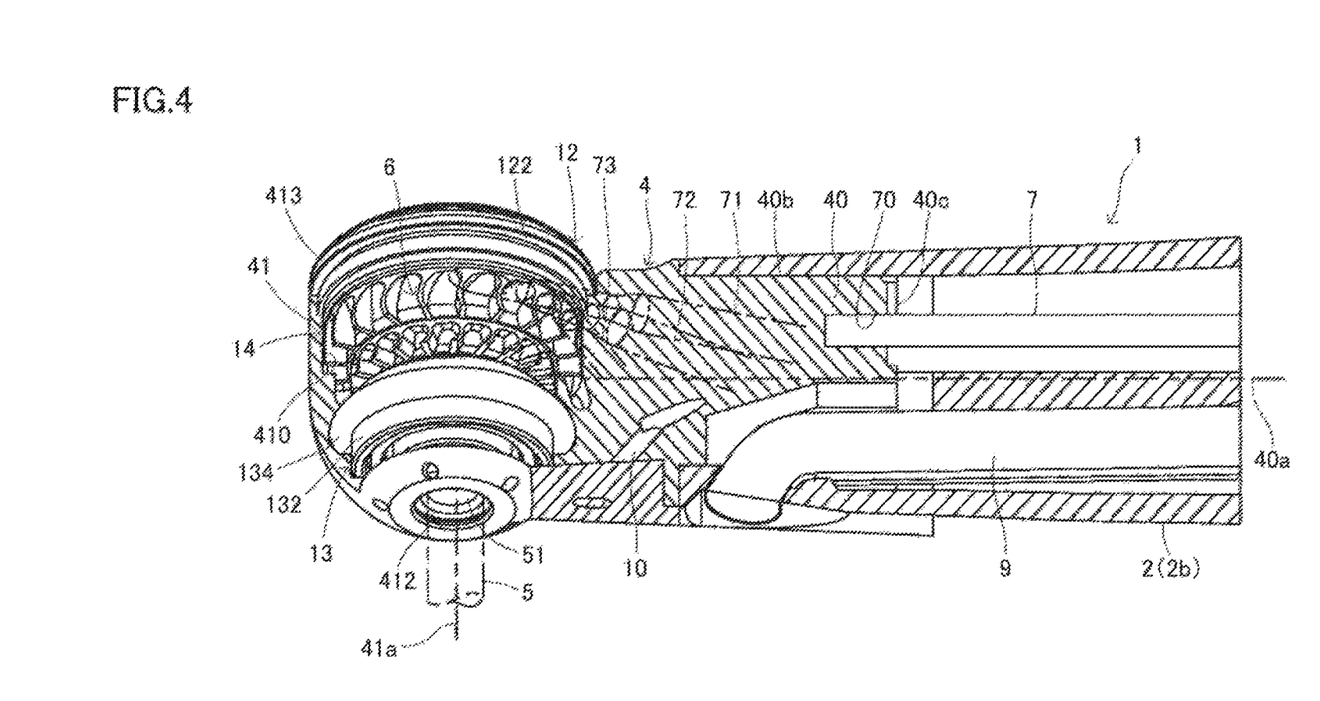
FIG. 4 is a partial cross-sectional view illustrating a main part of the air turbine handpiece according to the present embodiment.
Figure 5:
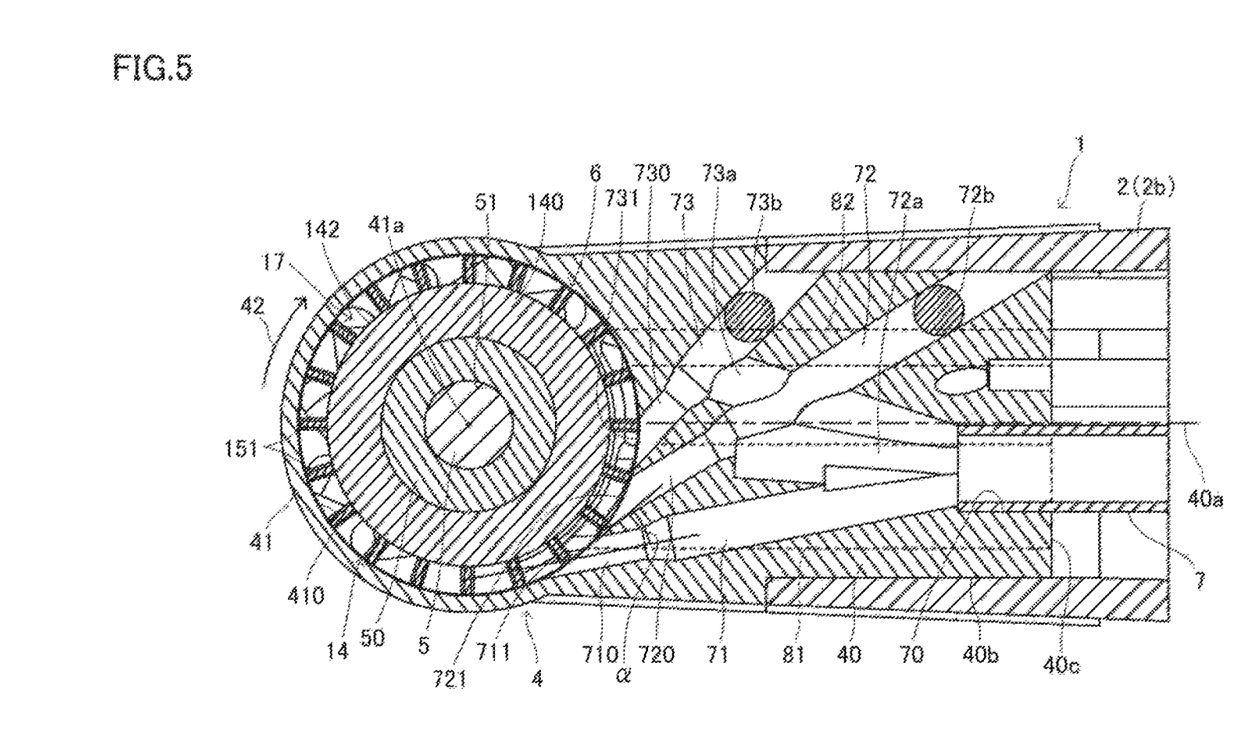
FIG. 5 is a transverse cross-sectional view illustrating a main part of the air turbine handpiece according to the present embodiment.

FIG. 2 is a side view illustrating the air turbine handpiece 1 according to the present embodiment FIG. 3 is a longitudinal sectional view illustrating a main part of the air turbine handpiece 1 according to the present embodiment. FIG. 4 is a partial cross-sectional view illustrating a main part of the air turbine handpiece 1 according to the present embodiment. FIG. 5 is a transverse cross-sectional view illustrating a main part of the air turbine handpiece 1 according to the present embodiment. The cross-sectional view in FIG. 5 is obtained by cutting the air turbine handpiece 1 along line IV-IV in FIG. 3.

The air turbine handpiece 1 includes a grip 2 to be grasped by an operator such as a dentist during treatment. A base end of the grip 2 is provided with a connection member 2a which is connected to a supply tube 3 for supplying air. A distal end of the grip 2 is connected to the head 4 via a neck 2b. The cutting tool 5 is detachably mounted to the head 4.

The head 4 is integrated with a shaft member 40 which is connected to the distal end of the grip 2 and a cylindrical housing 41 which is configured to house tire cutting tool 5 and a driving member 6 configured to drive the cutting tool 5. A rotation axis 41a of the cylindrical housing 41 is arranged perpendicular or substantially perpendicular to a central axis 40a of the shaft member 40. The rotation axis 41a corresponds to a central rotation axis of the cutting tool 5.

The shaft member 40 of the head 4 has a small diameter portion 40b which is sized and shaped to allow the shaft member 40 to be inserted into the distal end of the cylindrical grip 2. The shaft member 40 is provided with a plurality of through holes to fluidly communicate a rear end surface 40c on the side of the grip 2 with an inner wall surface of the cylindrical housing 41. The plurality of through holes include air supply passages 71 to 73 configured to supply pressurized air to the driving member 6, and exhaust passages 81 and 82 configured to discharge pressurized air from the driving member 6.

The air supply passages 71 to 73 are connected to an air supply pipe 7 that extends inside the grip 2 in the longitudinal axis direction of the grip 2 from the connection member 2a to which the supply tube 3 is connected. The air supply passage 71 communicates with a communication member 70 of the air supply pipe 7 which is drilled in the shall member 40. The air supply passages 72 and 73 communicate with the communication member 70 via communication passages 72a and 73a drilled in the shaft member 40. Thus, the pressurized air supplied from the air supply pipe 7 is introduced into the cylindrical housing 41 through the air supply passages 71 to 73, respectively.

The base ends of the gas supply passages 72 and 73 open to the outer circumferential surface of the small diameter portion 40b, and spherical sealing members (such as steel balls) 72b and 73b are pushed halfway into the gas supply passages 72 and 73 from the opening side thereof to seal the gas supply passages 72 and 73, respectively. The communication passage 73a is formed to transect the air supply passage. 72 to communicate with both the air supply passage 72 and the air supply passage 73.

The distal end of each of the air supply passages 71 to 73 is provided with a corresponding nozzle 710, 720, 730 with a small diameter. The distal ends of the nozzles 710, 720 and 730 open to the inner wall surface of the cylindrical housing 41 to bun an supply ports 711, 721 and 731, respectively. The nozzles 710, 720 and 730 are arranged in such a manner that the cutting tool 5 disposed inside the cylindrical housing 41 receives a rotary force about the rotation axis 41a in the direction indicated by an arrow 42 (the clockwise direction in FIG. 5) which is generated by the pressurized air ejected from the nozzles 710, 720, and 730.

As illustrated in FIG. 3, the exhaust passages 81 and 82 are formed below the air supply passages 71 to 73 as through holes extending from the rear end surface 40c to the inner wall surface of the cylindrical housing 41. The distal ends of the exhaust passages 81 and 82 open to the inner wall surface of the cylindrical housing 41 to form exhaust ports. The base ends of the exhaust passages 81 and 82 open to the rear end fare 40c, and communicate with an exhaust means (not shown) via the connection member 2a and the supply tube 3 illustrated in FIG. 2, using the inner cylindrical portion of the grip 2 as an exhaust path. Further, an auxiliary exhaust port 83 is formed in the shape of an elongated hole in communication with the exhaust passages 81 and 82, and thereby, a part of the air introduced into a first air passage 154 is directly discharged from the exhaust passages 81 and 82 without being guided to a second air passage 170 and a third air passage 164.

Further, the shaft member 40 is provide with a light member 9 configured to illuminate the distal end of the cutting tool 5 and a chip air passage 10 configured to supply water to the distal end of the cutting tool 5. Note that a water supply pipe and an air supply pipe in communication with the chip air passage 10 are not shown in the figures.

As illustrated in FIGS. 3 and 4, the cylindrical housing 41 of the head 4 has an cylindrical inner space 410 with a shape and a size corresponding to the outer profile of the driving member 6 configured to convert the pressurized air ejected froth the aft supply passages 71 to 73 into a rotary force to drive the cutting tool 5. The inner space 410 is opened with an upper opening 411 and a lower opening 412.

In order to hold the driving member 6 at a predefined position in the inner space 410, a ring-shaped sub-housing 413 is provided and detachably attached to the upper opening 411. An external thread is formed on an outer circumferential surface of the sub-housing 413, and is screwed into an internal thread harmed on an inner circumferential surface of the opening 411, and the engagement is locked by a screw 414 screwed into the head 4.

Further, a cap support ring 415 is disposed on the upper surface of the sub-housing 413, and a cap 11 is detachably attached to the opening 411 through the intermediary of the cap support ring 415. The cap support ring 415 engages with the circumferential edge of the cap 11 to prevent the cap 11 from falling out from the upper direction while allowing the cap 11 to move up and down along the rotation axis 41a.

As illustrated in FIG. 3, a spring member 111 is resiliently biased between the inner surface of the cap 11 and the driving member 6. The cap 11 is stably held at a position illustrated in the figure by a biasing force of the spring member 111. In the resiliently biased state, the spring member 111 acts on a pressing ring 112 which is disposed to straddle an outer ring 122 of an upper bearing 12 and the cap support ring 415, and functions to hold the driving member 6 at a predefined position. When the cap 11 is pressed against the biasing force of the spring member 111, the cutting tool 5 may be released from a tool support member 50 for replacement.

As illustrated in FIG. 3, the tool support member 50 is provided in the driving member 6 of the cutting tool 5 to support the cutting tool 5 along the rotation axis 41a of the inner space 410. The tool support member 50 is formed with a hole (tool support hole) 51 having a predetermined depth from one end (the lower end in FIGS. 3 and 4). The tool support member 50 is provided with a chuck mechanism configured to hold the cutting tool 5 inserted into the tool support hole 51.

The tool support member 50 is rotatably supported about the rotation axis 41a by an upper bearing 12 provided at an upper position and a lower bearing 13 provided at a lower position. The upper bearing 12 includes an inner ring 121, an outer ring 122 arranged concentrically with the inner ring 121, and a plurality of balls 123 arranged between the inner ring 121 and the outer ring 122. The inner ring 121 is fixed outside the tool support member 50. The outer ring 122 is pressed into the sub-housing 413 and fixed relative to the sub-housing 413 via an O-ring 124. The inner circumference of the sub-housing 413 is formed with a circumferential groove 413a for housing the O-ring 124 therein. The O-ring 124 prevents the pressurized air ejected to a rotor 14 from leaking upward.

The lower bearing 13 is a ball bearing similar to the upper bearing 12. Similar to the upper bearing 14, the lower bearing 13 includes an inner ring 131, an outer ring 132, and a plurality of balls 133 disposed therebetween. The inner ring 131 is fixed outside the tool support member 50. The outer ring 132 is pressed into the inner space 410 of the cylindrical housing 41 and fixed relative to the inner space 410 via an O-ring 134. The O-ring 134 prevents the pressurized air from leaking downward.

The inner space 410 of the cylindrical housing 41 is shaped and sized in accordance with the region where the upper bearing 12, the lower bearing 13 and the rotor 14 are arranged, and is substantially composed of an upper cylindrical portion 416 with a large inner diameter, a lower cylindrical portion 417 with a small inner diameter, and a step portion 418 formed between the upper cylindrical portion 416 and the lower cylindrical portion 417. The O-ring 134 provided for the lower bearing 13 is housed in a circumferential groove 417a formed on the inner circumference of the lower cylindrical portion 417.

A double-wheel rotor 14 is integrally provided in the region of the tool support member 50 between the upper bearing 12 and the lower bearing 13 to rotate the tool support member 50 and the cutting tool 5 about the rotation axis 41a via the tool support member 50 by using the pressurized air ejected from the air supply passages 71 to 73.

The height position of the first air passage 154 (the height position along the rotation axis 41a) is set in such a manner that when the rotor 14 is provided in the inner space 410, the pressurized an ejected from the nozzles 710, 720, and 730 is blown into the upper portion of the first air passage 154. A part of the first air passage 154 from the lower surface of the upper ceiling wall to the outer circumference of a large diameter ring portion 142 is formed as a curved surface 155 curved inward along the radial direction so that the air blown into the first air passage 154 from the outside of the rotor 14 in the radial direction is smoothly directed downward along the curved surface 155 with a minimum air resistance. The side surface of each first turbine blade 151 when viewed from the direction toward the rotation axis 41a is recessed from the upstream side toward the downstream side in the rotation direction 42 of the rotor.

As illustrated in FIG. 3, an air guide member 17 configured to guide air from a first turbine blade portion 15 to a second turbine blade potion 16 is provided on the inner circumference of the inner space 410 of the head 4, and specifically on the step portion 418.

The pressurized ejected from the air supply passages 71 to 73 into the inner space 410 is guided into the first air passage 154 from the outside thereof in the radial direction, and the pressurized ejected from the lower end of the first air passage 154 is guided into the third air passage 164 from outside thereof in the radial direction. The air guide member 17 includes a plurality (seven in the present embodiment) of second air passages 170 configured to guide air from the lower end of the first air passage 154 into the third air passage 164. The plurality of second air passages 170 are arranged side by side along the circumferential direction about the rotation axis 41a.

When the air turbine handpiece 1 with the configuration as described above is used to cut a tooth, a cutting tool 5 suitable for a specific operation is selected as illustrated in FIG. 2, and is mounted to the tool support member 50 from the lower end thereof. Next, the pressurized air is supplied from a pressurized an supply source (not shown) into each of the air supply passages 71 to 73 through the supply tube 3. The pressurized air is supplied from the air supply passages 71 to 73 to the corresponding nozzles 710, 720 and 730. The pressurized air passing through the nozzles 710, 720 and 730 is accelerated and ejected from the air supply ports 711, 721 and 731 in a direction perpendicular to the rotation axis 41a of the rotor 14 (downstream side in the rotation direction 42 of the rotor 14). When the pressurized air is blown into the first air passage 154, the energy of the pressurized air acts on a working surface 152 of the first turbine blade 151 in the first turbine blade portion 15, and the rotor 14 is rotated around the rotation axis 41a in the direction indicated by the arrow 42. Because of the rotation, the pressurized air is sequentially blown into the first air passage 154 running opposite to the air supply ports 711, 721 and 731 to keep the rotor 14 rotating. Since the side surface of the first turbine blade 151 is recessed in the rotation direction 42, the energy of the pressurized air, blown into the first air passage 154, acts on the working surface 152, and is effectively consumed as the rotary power of the rotor 14. Therefore, the rotor 14 rotates at a high rotary speed with a large rotary torque.

Thus, in the air turbine handpiece 1, the rotor 14 provided inside the head 4 is rotated by the pressurized air, and the cutting tool 5 is rotated by the rotation of the rotor 14. When an abnormality in which those members which are normally not in contact with each other during the rotation of the rotor 14 contact each other occurs, the surface of the head 4 may become overheated by the frictional heat generated by the contacting members, whereby the temperature of the surface of the head 4 may be raised to approximately 40° C. or more. In order to prevent such abnormality from occurring, the operator needs to determine whether or not a thermal abnormality is present in the air turbine handpiece 1.

Conventionally, as a technical solution, a temperature detecting member that detects the temperature of a handpiece is attached to the handpiece. However, in the conventional detection method, since the temperature detecting member is integrated with the handpiece, the temperature detecting member will suffer from fast degradation during the use of the handpiece. For example, a dental handpiece is subjected to an autoclave sterilization of 135° C. each time after use, but it is hard for a temperature detecting member to withstand the temperature of 135° C. for a long period of time. Therefore, it is required to find an approach to determine whether or not a thermal abnormality of a handpiece is present for a long period of time. Thus, the present embodiment provides a detection tool 500 and a detection method capable of determining whether or not a thermal abnormality is present in a handpiece for a long period of time. Hereinafter, the defection tool 500 and the detection method according to the present embodiment will be described in detail.

[Configuration of Detection Tool]

The configuration of the detection tool 500 according to the present embodiment will be described with reference to FIGS. 6 and 7.

Figure 6:
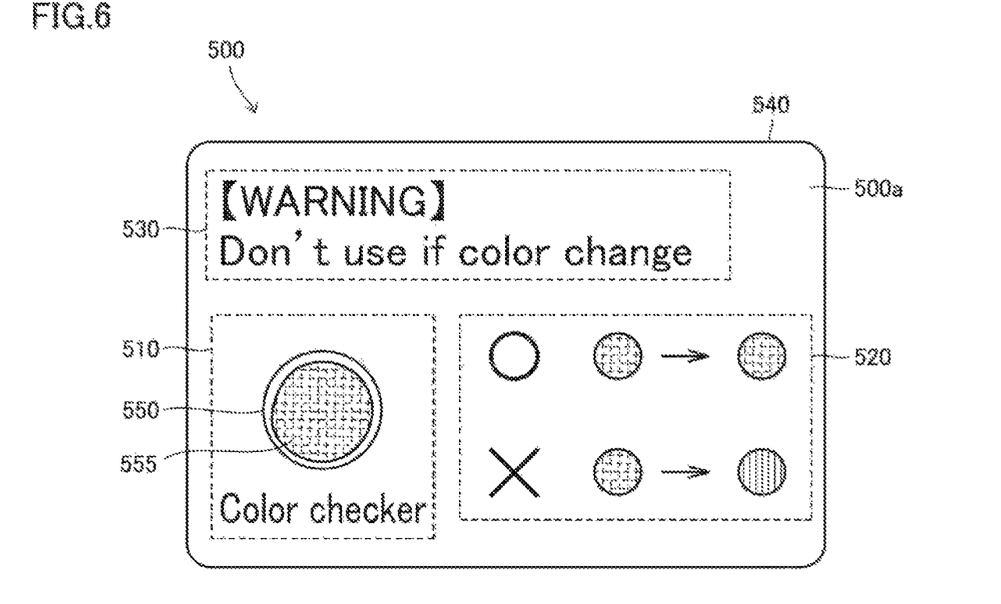
FIG. 6 is a schematic s illustrating one site surface of the detection tool according to the present embodiment.

FIG. 6 is a schematic view illustrating one side surface of the detection tool according to the present embodiment. As illustrated in FIG. 6, the detection tool 500 is a card-type temperature detection tool including a main body 540. One surface (for example, the front surface) 500a on one side (for example, the front side) of the main body 540 includes a region 510, a region 520 and a region 530.

The region 510 is provided with a detection section 550 that detects the temperature of air released from the air turbine handpiece 1.

The detection section 550 has a shape serving as a target into which the air released from the air turbine handpiece 1 is blown. As illustrated in FIG. 5, the cross section of the head 4 of the air turbine handpiece 1 according to the present embodiment is circular. Therefore, the detection section 550 has a size equal to or greater than the size of the head 4 of the air turbine handpiece 1 is accommodated, and is formed into the same circular shape as the head 4.

The detection section 550 includes a thermo-sensitive material 555 which changes color in response to a temperature change. The thermo-sensitive material 555 changes color when the thermo-sensitive material 555 is heated to a temperature equal to or higher than a predetermined temperature, and once the color of the thermo-sensitive material 555 is changed, the thermo-sensitive material 555 does not return to an original color.

The temperature at which the thermo-sensitive material 555 according to the present embodiment changes color is set to a temperature at which a thermal abnormality in the air turbine handpiece 1 may be appropriately detected without any erroneous detection caused by the indoor temperature. For example, the thermo-sensitive material 555 according to the present embodiment changes color when the thermo-sensitive material 555 is heated to about 40° C. or more. When the thermo-sensitive material 555 is blown by the air released from the air turbine handpiece 1, the thermo-sensitive material 555 maintains color at a predetermined color (for example yellow) when the temperature of the air is lower than a predetermined temperature (for example about 40° C.), and changes from a predetermined color (for example yellow) to a specific color (for example red) when the temperature of the air is equal to or higher than the predetermined temperature (for example about 40° C.).

In general, the room temperature of a dental hospital is set at a comfortable temperature of 28° C. but it may become higher than 30° C. in summer or the like. In such an environment, if the thermo-sensitive material 555 changes color at 35° C., the thermo-sensitive material 555 may change color due to the influence of the indoor temperature. On the other hand, it has been empirically confirmed that the air turbine handpiece 1 rises up to about 40° C. or more when a thermal abnormality is present in the air turbine handpiece 1. Therefore, if the thermo-sensitive material 555 that changes color when heated to about 40° C. or more is provided in the detection section 550, it is possible for the detection tool 500 to further accurately detect the thermal abnormality of the air turbine handpiece 1 without any erroneous detection. It is preferable that the thermo-sensitive material 555 changes color when heated to 40° C. or more, but it is acceptable that the thermo-sensitive material 555 changes color when detecting a temperature in the range of 40° C. to 40±1° C. or 40±2° C.

The thermo-sensitive material 555 may be a sticker-type detection member to be stuck to a position corresponding to the detection section 550 in the region 520, or may be a paint-type detection member to be painted to a position corresponding to the detection section 550 in the region 520.

The region 520 is a region for describing the content of color changes of the thereto-sensitive material 555. For example, when the thermo-sensitive material 555 is blown by the an released from the head 4 of the air turbine handpiece 1, the region 520 describes that the use of the air turbine handpiece 1 is permitted if the thermo-sensitive material 555 maintains its color at a predetermined color (for example yellow), and the use of the air turbine handpiece 1 is prohibited if the thermo-sensitive material 555 changes its color from a predetermined color (for example yellow) to a specific color (for example red).

The region 530 describes a warning which indicates that the use of the air turbine handpiece 1 is prohibited if the color of the thermo-sensitive material 555 is changed.

Figure 7:
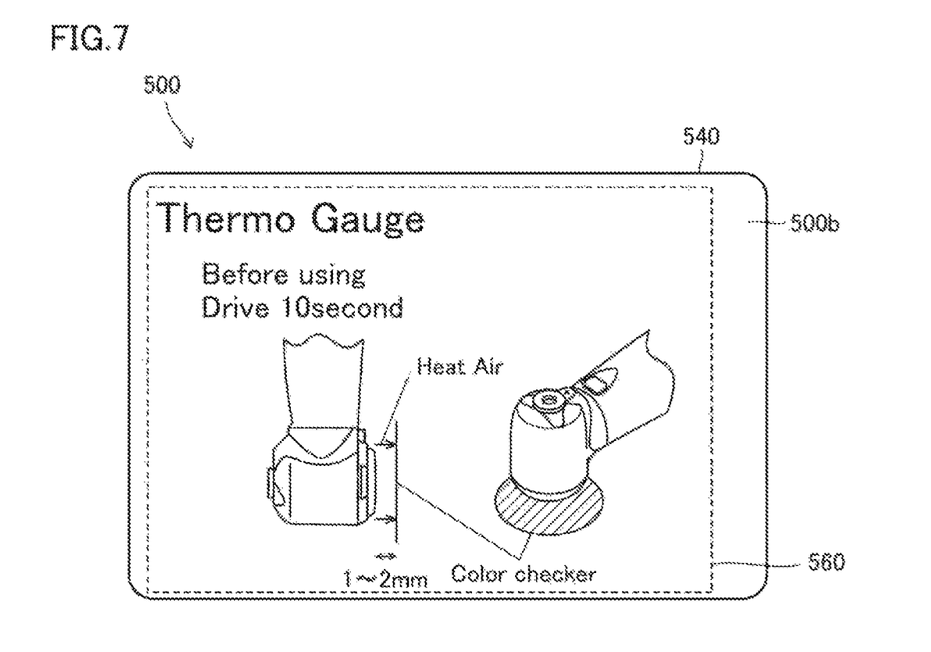
FIG. 7 is a schematic view illustrating the other side surface of the detection according to the present embodiment.

FIG. 7 is a schematic view illustrating the other side surface of the detection tool 500 according to the present embodiment. As illustrated in FIG. 7, one surface (for example, the back surface) 500b on the other side (for example the back side) of the main body 540 includes a region 560.

The region 560 is a region for describing a detection method for detecting the temperature of air released from the air turbine handpiece 1 by using the detection section 550. For example, the region 560 describes that the head 4 of the air turbine handpiece 1 is brought close to the detection section 500 within a predetermined distance after the air turbine handpiece 1 has been driven to operate for a predetermined time. The predetermined time is 2 seconds or more, and preferably 8 seconds to 12 seconds (for example, 10 seconds). The predetermined distance between the detection section 550 and the an turbine handpiece 1 is 1 mm to 10 mm, and preferably 1 mm to 2 mm.

Although the region 560 illustrated in FIG. 7 describes that the air turbine handpiece 1 is driven to operate for 10 seconds, it is acceptable to describe that the air turbine handpiece 1 is driven to operate for 2 seconds or more, or that the air turbine handpiece is driven to operate for 8 seconds to 12 seconds. Although the region 560 illustrated in FIG. 7 describes that the distance between the detection section 550 and the air turbine handpiece 1 is 1 mm to 2 mm, it is acceptable to describe that the distance between the detection section 550 and the air turbine handpiece is 1 mm to 10 mm.

[Detection Method]

Figure 8:
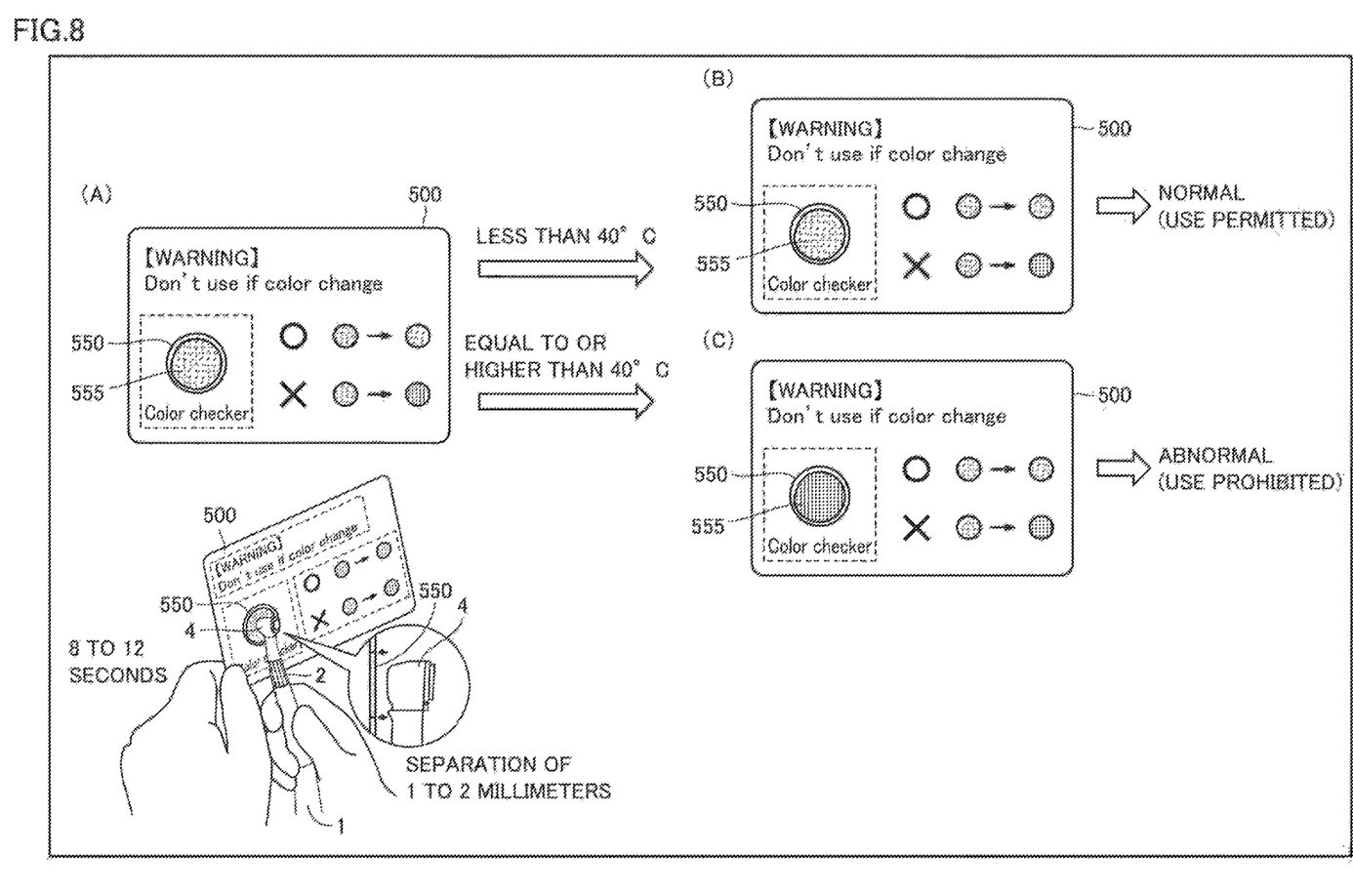
FIG. 8 is a schematic view illustrating an example usage of the detection tool according to the present embodiment.

A detection method for detecting the temperature of air released from the air turbine handpiece 1 by using the detection tool 500 according to the present embodiment will be described with reference to FIG. 8. FIG. 8 is a schematic view illustrating an example usage of the detection tool 500 according to the present embodiment.

As illustrated in FIG. 8, firstly, an operator holds the air turbine handpiece 1 with one hand, and holds the card-type detection tool 500 with the other hand. Then, the operator brings the head 4 of the air turbine handpiece 1 close to the detection section 550 of the air turbine handpiece 1 within a predetermined distance after the air turbine handpiece 1 has been driven to operate for at least 2 seconds, and preferably 8 seconds to 12 seconds for example, 10 seconds). Specifically, the operator moves the head 4 of the air turbine handpiece 1 close to the detection section 550 until the distance between the detection section 550 and the air turbine handpiece 1 is 1 mm to 10 mm, and preferably 1 mm to 2 mm.

In the present embodiment, the duration of 8 seconds to 12 seconds is such a duration that is required to stabilize the operation of the air turbine handpiece 1. Thus, at the time of detecting the temperature of air released front the air turbine handpiece 1, the operator may use the detection tool 500 to detect the temperature of the air after the operation of the air turbine handpiece 1 is stabilized.

The distance of 1 mm to 2 mm between the detection section 550 and the air turbine handpiece 1 is such a distance range that allows the thermo-sensitive material 555 included in the detection section 550 to stably detect the temperature of air released from the air turbine handpiece 1, which makes it possible for the operator to further accurately detect the temperature of air released from the air turbine handpiece 1.

As illustrated in FIGS. 8A and 8B, if the temperature of air released from the air turbine handpiece 1 is lower than a predetermined temperature (for example, approximately 40° C.), the thermo-sensitive material 555 maintains its color at a predetermined color (for example, yellow). In this case, since no thermal abnormality is present in the air turbine handpiece 1, the use of the air turbine handpiece 1 is permitted.

On the other hand, as illustrated in FIGS. 8(A) and 8(C), if the temperature of air released from the air turbine handpiece 1 is equal to or higher than a predetermined temperature (for example, approximately 40° C.), the thermo-sensitive material 555 changes its color from a predetermined color (for example, yellow) to a specific color (for example, red). In this case, since a thermal abnormality is present in the air turbine handpiece 1, the use of the air turbine handpiece 1 is prohibited.

As described above, the determination of a thermal abnormality in the air turbine handpiece 1 by using the detection tool 500 is performed before using the air turbine handpiece to treat a patient. Thus, an operator such as a dentist may determine the thermal abnormality in the air turbine handpiece before treating a patient.

[Main Concept]

As described above, the present embodiment includes the following concepts.

The detection tool 500 includes a detection section 550 that detects the temperature of air released from the air turbine handpiece 1, and a main body 540 that includes a surface. The detection section 550 is provided on the surface to allow the air turbine handpiece 1 to be brought close to the detection section 550.

Thus, the operator may determine whether or not a thermal abnormality is present in the air turbine handpiece 1 by bringing the air turbine handpiece 1 close to the detection section 550 of the detection tool 500. Further, since the detection tool 500 is separate from the air turbine handpiece 1, it is possible to use the detection tool 500 for a long period of time to determine whether or not a thermal abnormality is present in the air turbine handpiece 1 without suffering from degradation during the use of the air turbine handpiece 1.

The detection section 550 includes a thermo-sensitive material 555 which changes in response to a temperature change. In the present embodiment, the thermo-sensitive material 555 changes color from yellow to red in response to a temperature change.

Thus, the operator may determine whether or not a thermal abnormality is present in the an turbine handpiece by utilizing the characteristics of the thermo-sensitive material 555.

The thermo-sensitive material 555 changes color when it detects air at a temperature equal to or higher than a predetermined temperature. In the present embodiment, the thermo-sensitive material 555 changes color when it detects air at a temperature equal to or higher than about 40° C. (for example a temperature from 40° C. to 40±1° C. or 40±2° C.) at which a thermal abnormality in the air turbine handpiece 1 may be appropriately detected without any erroneous detection caused by the indoor temperature.

Thus, the operator may further accurately determine whether or not a thermal abnormality is present in the air turbine handpiece 1 without being adversely affected by the indoor temperature as much as possible and thereby without any erroneous detection.

The thermo-sensitive material 555 is configured not to return to the original color once the color thereof is charmed in response to the temperature change.

Since the thermo-sensitive material 555 does not return to the original color once the color thereof is changed, it is possible to prevent the operator from missing a thermal abnormality, which makes it possible for the operator to accurately determine whether or not a thermal abnormality is present in the air turbine handpiece 1.

As illustrated in FIG. 6, the main body 540 includes a region 520 for describing the content of color changes of the thermo-sensitive material 555.

Thus, the operator may appropriately use the detection tool 500 to determine whether or not a thermal abnormality is present the air turbine handpiece 1 by checking the content described in the region 520 included in the main body 540.

The detection section 550 has a shape into which the air released from the air turbine handpiece 1 is blown.

Thus, the operator may appropriately blow the air released from the air turbine handpiece 1 to the detection section 550 to accurately determine whether or not a thermal abnormality is present in the air turbine handpiece 1.

The detection section 550 has a size equal to or greater than that of the head 4 of the air turbine handpiece 1.

Thus, the operator may appropriately bring the head 4 of the air turbine handpiece 1 close to the detection section 550 to accurately determine whether or not thermal abnormality is present in the air turbine handpiece 1.

The main body 540 includes a region 560 for describing a detection method for detecting the temperature of air released from the air turbine handpiece 1 by using the detection section 550, and the detection method includes bringing the air turbine handpiece 1 close to the detection section 550 within a predetermined distance after the air turbine handpiece 1 has been driven to operate for a predetermined time.

Thus, the operator may accurately determine whether or not a thermal abnormality is, present in the air turbine handpiece 1 by using the method.

The detection method includes bringing the head 4 of the air turbine handpiece 1 close to the detection section 550 within a predetermined distance.

Thus, the operator may further accurately detect the temperature of air released from the an turbine handpiece 1 by the detection section 550 to further accurately determine whether or not a thermal abnormality is present in the an turbine handpiece 1.

The predetermined time for driving the air turbine handpiece 1 before the air turbine handpiece 1 is brought close to the detection section 550 of the detection tool 500 is 2 seconds or more, and preferably 8 seconds to 12 seconds (for example, 10 seconds).

Thus, the operator may use the detection tool 500 to detect the temperature of the air after the operation of the air turbine handpiece 1 is stabilized.

The predetermined distance between the detection section 550 and the air turbine handpiece 1 is 1 mm to 10 mm, and preferably 1 mm to 2 mm.

Thus, the operator may further accurately detect the temperature of air released from the air turbine handpiece 1.

[Modifications]

The present disclosure is not limited to the embodiments described above, and various modifications and applications are possible. Hereinafter, applicable modifications of the present disclosure will be described.

(Detection Tool According to Another Embodiment)

Although the detection tool 500 according to the present embodiment is configured to detect the temperature of air released from the air turbine handpiece 1 by using the color changes of the thermo-sensitive material 555, the present disclosure is not limited thereto.

Figure 9:
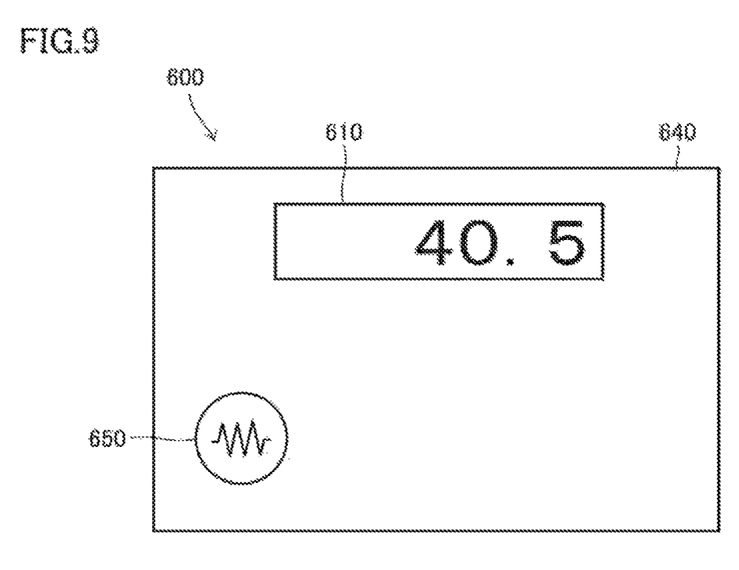
FIG. 9 is a schematic diagram illustrating a detection tool according to another embodiment.

FIG. 9 is a schematic diagram illustrating a detection tool 600 according to another embodiment. The detection tool 600 illustrated in FIG. 9 is a card-type detection tool that electrically measures the temperature. Specifically, one surface (for example, the front surface) on one side (for example, the front side) of the main body 640 of the detection tool 600 is provided with a detection section 650 that detects the temperature of air released from the air turbine handpiece 1 and a display unit 610 that displays the temperature of the air detected by the detection section 650.

The detection section 650 is a temperature sensor for electrically measuring a temperature, such as a built-in thermocouple or a built-in temperature measuring resistor. When an operator brings the head 4 of the air turbine handpiece 1 close to the detection section 650, the detection section 650 electrically measures the temperature of air released from the head 4. The measured air temperature is displayed on the display unit 610.

As described above, the detection tool 600 includes a detection section 650 that detects the temperature of air released from the air turbine handpiece 1, and a main body 640 that includes a surface. The detection section 650 is provided on the surface to allow the air turbine handpiece 1 to be brought close to the detection section 650.

Thus, the operator may determine whether or not a thermal abnormality is present in the air turbine handpiece 1 by bringing the air turbine handpiece 1 close to the detection section 650 of the detection tool 600. Further, since the detection tool 600 is separate flow the air turbine handpiece 1, it is possible to use the detection tool 600 for a long period of tune to determine whether or not a thermal abnormality is present in the air turbine handpiece 1 without suffering from degradation during the use of the air turbine handpiece 1.

The detection tool is not limited to the detection tool 500 and the detection tool 600, and any other temperature measuring device such as a thermometer or a temperature sensor may be used to measure the temperature of air released from the air turbine handpiece 1. The detection tool may be a contact-type detection tool that measures the temperature of air released from the air turbine handpiece 1 by contacting the air turbine handpiece or a non-contact type detection tool that measures the temperature of air released from the air turbine handpiece 1 without contacting the air turbine handpiece 1.

(Thermo-Sensitive Material)

The thermo-sensitive material 555 according to the present embodiment is an irreversible thermo-sensitive material that does not return to the original color after it is heated to a temperature equal to or higher than a preset temperature to change color, but it is not limited thereto. For example, the thermo-sensitive material may be a reversible thermo-sensitive material which changes color after it is heated to a temperature equal to or higher than a preset temperature, and then returns to the original color when it is cooled to a temperature lower than the preset temperature. Thus, the detection tool using the reversible thermo-sensitive material may be repeatedly used by the operator a plurality of times, which is different from the disposable detection tool 500 using the irreversible thermo-sensitive material.

The thermo-sensitive material 555 according to the present embodiment changes color when it is heated to a temperature equal to or higher than a preset temperature, but it is not limited to color, and it is acceptable to change the pattern or shape thereof.

(Shape of Detection Section)

Although the detection section 550 according to the present embodiment is formed into a circular shape in accordance with the cross section of the head 4 of the air turbine handpiece 1, the detection section 550 may be formed in another shape such as a quadrangular shape as long as the size of the detection section 550 is equal to or greater than that of the head 4 of the air turbine handpiece 1.

(Air Turbine Handpiece)

Although the detection tool 500 according to the present embodiment is configured to detect the temperature of air released from the air turbine handpiece which has the configuration as illustrated in FIGS. 2 to 5, the detection tool 500 may detect the temperature of air released from an air turbine handpiece that has another configuration. In other words, the detection tool 500 may be used in combination with any air turbine handpiece that generates air.

Although the embodiments have been described, it should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

What is claimed is:

1. A detection tool, comprising:
   a detection sensor configured to detect a temperature of air released from an air turbine handpiece; and
   a main body that includes a surface, the detection sensor being disposed on the surface to allow the air turbine handpiece to be brought close to the detection sensor,
   wherein the air turbine handpiece includes a head and a cutting tool attached to the head, the air turbine handpiece is configured to rotate the cutting tool by a driving force generated by air, the detection sensor includes a thermo-sensitive material which changes color in response to a temperature change, and the thermo-sensitive material changes color when detecting air having a temperature of about 40° C. or more.

2. The detection tool according to claim 1, wherein once the color of the thermo-sensitive material is changed, the thermo-sensitive material does not return to an original color.

3. The detection tool according to claim 1, wherein the main body includes a region describing the content of color changes of the thermo-sensitive material.

4. The detection tool according to claim 1, wherein the detection sensor has a shape serving as a target onto which the air released from the air turbine handpiece is blown.

5. The detection tool according to claim 4, wherein the detection sensor has a size equal to or greater than a size of a head of the air turbine handpiece.

6. The detection tool according to claim 1, wherein the main body includes a region describing a detection process for detecting the temperature of air released from the air turbine handpiece by using the detection sensor, the detection process including driving the air turbine handpiece to operate for a predetermined time and bringing the air turbine handpiece close to the detection sensor within a predetermined distance.

7. The detection tool according to claim 6, wherein the detection process includes bringing a head of the air turbine handpiece close to the detection sensor within the predetermined distance.

8. The detection tool according to claim 6, wherein the predetermined time is two seconds or more.

9. The detection tool according to claim 6, wherein the predetermined distance between the detection sensor and the air turbine handpiece is 1 mm to 10 mm.

10. A detection method, comprising:

detecting, with a detection sensor on a main body, a temperature of air released from an air turbine handpiece, the main body including a surface on which the detection sensor is disposed to allow the air turbine handpiece to be brought close to the detection sensor; and changing a color on the detection sensor on the main body in response to the detected temperature of the air released from the air turbine handpiece being above a predetermined threshold, wherein the air turbine handpiece includes a head and a cutting tool attached to the head, the air turbine handpiece is configured to rotate the cutting tool by a driving force generated by air, the detection sensor includes a thermo-sensitive material which changes color in response to a temperature change, and the thermo-sensitive material changes color when detecting air having a temperature of about 40° C. or more.

* * * * *